US005537367A

United States Patent [19]

Lockwood et al.

[11] Patent Number: 5,537,367

[45] Date of Patent: Jul. 16, 1996

[54] SPARSE ARRAY STRUCTURES

[76] Inventors: Geoffrey R. Lockwood, 2935 Huntington Rd., Shaker Heights, Ohio 44120; Francis S. Foster, 24 Glen Oak Dr., Toronto, Ontario, Canada, M4E 1Y5

[21] Appl. No.: 326,493

[22] Filed: Oct. 20, 1994

[51] Int. Cl.$^6$ .............................. G01S 15/00; G01S 13/00

[52] U.S. Cl. .............................. 367/87; 342/372; 342/373; 128/660.01

[58] Field of Search .............................. 342/368, 372, 342/373; 367/103, 105, 905, 100, 88, 87; 128/660.08, 661.01, 660.01

[56] References Cited

U.S. PATENT DOCUMENTS

| | | | |
|---|---|---|---|
| 4,180,792 | 12/1979 | Lederman et al. | 367/7 |
| 4,784,147 | 11/1988 | Moshfeghi | 128/653.1 |
| 5,081,463 | 1/1992 | Hariu et al. | 342/372 |
| 5,216,428 | 6/1993 | DuFort | 342/368 |
| 5,225,841 | 7/1993 | Krikorian | 342/204 |
| 5,233,356 | 8/1993 | Lee et al. | 342/368 |
| 5,278,747 | 1/1994 | Hoctor et al. | 364/413.25 |
| 5,278,757 | 1/1994 | Hoctor et al. | 128/661.01 |
| 5,345,246 | 9/1994 | Sezai | 342/368 |

*Primary Examiner*—Ian J. Lobo
*Attorney, Agent, or Firm*—Mark B. Eisen

[57] ABSTRACT

Novel sparse array structures are described which greatly reduce the total number of independent transmit and receive elements in the array without significantly degrading imaging performance. Periodic sparse transmit and receive arrays, one with a first spacing between elements or groups of elements and the other with a different spacing between elements or groups of elements, are combined through interpolation to create a sparse array having imaging capability comparable to that of an equivalent dense array.

16 Claims, 13 Drawing Sheets

SPARSE ARRAY STRUCTURES

FIELD OF INVENTION

This invention relates to arrays for transmitting and receiving acoustic or electromagnetic energy. In particular, this invention relates to an improved sparse array structure and method which provides an effective aperture and radiation pattern comparable to that of a dense array having a far greater number of array elements.

BACKGROUND OF THE INVENTION

Arrays of transducers are commonly used in such diverse fields as radio astronomy, seismic exploration, sonar, radar, communications and ultrasound imaging. The primary function of an array is to transmit and/or receive electromagnetic or acoustic energy over a specified region of space. Individual array elements are arranged along a line in a linear array, across a surface in a two-dimensional array or around a volume in a three-dimensional array.

The direction of energy propagation is controlled by introducing phase shifts and weighting to the signals delivered to and received from the individual array elements, so that signals transmitted to or received from the desired region in space constructively interfere while signals outside of this region destructively interfere. How well an array achieves this constructive and destructive interference is described by the radiation pattern of the array.

The radiation pattern is plot of the amplitude of the signal transmitted or received by the array as a function of position in space. In many situations the same array is used to both transmit energy and receive energy, and in these cases it is more useful to describe a transmit-receive radiation pattern, which is defined by the product of the transmit and receive radiation patterns. The transmit-receive radiation pattern gives a measure of the sensitivity and resolution with which the array will be able to detect objects in its field. Usually the transmit-receive radiation pattern is plotted in polar coordinates at a given distance in front of the array.

An example of a typical transmit-receive radiation pattern is shown in FIG. 1. The radiation pattern consists of a prominent main lobe and a number of secondary lobes. The main lobe corresponds to the desired region in space over which energy will be transmitted and from which energy will be received. The width of the main lobe is inversely proportional to the width of the array and determines the resolution of the array. Secondary lobes are caused by imperfect destructive interference outside of the desired region in space and result in the transmission and reception of unwanted energy. Thus, given a fixed number of array elements, a major problem which must be resolved when designing an array is how to minimize the width of the main lobe while keeping the secondary lobes as small as possible.

To optimize the array performance it is often useful to vary the weighting of the individual array elements. This is referred to as "apodization". The aperture of an array is given by a function which represents the element weighting as a function of the element position, as shown in FIG. 2 which illustrates as an example the receive and transmit aperture functions for a 6 element array with one-half wavelength (λ/2) element spacing. Separate aperture functions are defined for the array when it is transmitting energy and when the array is receiving energy, and each element in the transmit and receive aperture functions is represented by a delta function with an amplitude corresponding to the element weighting. In this example, identical element weighting has been used for each element.

The effective aperture E(x) of an array that both transmits and receives energy, a so-called "pulse echo" or "transmit-receive" array, is defined by the convolution of the transmit A(x) and receive B(x) aperture functions:

$$E(x)=A(x)*B(x)$$

where the symbol * denotes the mathematical operation of convolution. As can be seen in FIG. 2, with transmit and receive apertures having uniform weighting the effective aperture is triangular and has a width equal to twice the width of the individual transmit or receive aperture function. The transmit-receive radiation pattern of the focused array is given by the Fourier transform of the effective aperture. Thus, the beam pattern of the focused array is completely defined by the effective aperture of the array and, conversely, the effective aperture exhaustively defines the parameters for the array.

There are two main classes of arrays: periodic arrays and aperiodic arrays. In a periodic array, the elements are equally spaced. This is the most common form of array and the easiest to design, and there are a number of methods available for obtaining the minimum main lobe width for a given maximum secondary lobe pattern. However, the periodic arrangement of array elements creates additional unwanted main lobes called grating lobes.

The angular displacement of the grating lobes is determined by the distance separating adjacent array elements. To eliminate grating lobes in a periodic array it is necessary to space the elements no further than approximately one half wavelength (λ/2) apart, but an array that satisfies the λ/2 condition, known as a "dense" array, requires a large number of array elements. This can lead to unacceptable array complexity and cost, particularly for two- and three-dimensional arrays. Close spacing between elements can also lead to undesirable mutual coupling between adjacent elements, in which the signal from one element is distorted by the proximity of adjacent elements.

Arrays which have fewer elements than required to satisfy the λ/2 condition are often referred to as "sparse" arrays. Eliminating the grating lobes in a sparse array requires elimination of the periodicity of the array. This can be accomplished by varying the separation between different pairs of array elements, however large secondary lobes can still be present.

Designing an aperiodic array to minimize secondary lobes is difficult. A number of algorithms for selecting the element spacing in an aperiodic array have been proposed. However, it has been shown that sparse arrays designed by these algorithmic procedures were no better and often worse in terms of peak secondary lobe levels than sparse arrays in which the location of the array elements were selected at random.

More recently, computer optimization methods have been used to design the array geometry and element weighting to minimize a cost function which defines the desired relationship between the number of elements, the main lobe width and the peak side lobe levels. It has also been suggested that optimization methods which are used by adaptive arrays to remove interference or compensate for blocked elements could be applied to the design of maximally sparse arrays.

An alternative approach to minimize the number of array elements while reducing the secondary lobes has been proposed by von Ramm et al in "Grey Scale Imaging Photo-opt Inst. Engineers, Medicine IV, vol. 70, pp.

266–270, 1975. Von Ramm et al showed that the peak secondary lobes could be reduced by using different transmit and receive array geometries. They demonstrated that for a 16 element linear array a 7 dB improvement in the peak side lobe levels could be obtained when the inter-element spacing of the receive array was reduced to one-half that of the transmit array.

In "High Speed Ultrasonic Volumetric Imaging System—Part I: Transducer Design and Beam Steering", IEEE Trans. Ultrason., Ferroelect. Freq. Contr., vol. 38, pp. 100–108, 1991, Smith et al applies this idea to the design of a two-dimensional array in which the transmitter elements and the receiver elements are arranged in two cross patterns with the transmit cross oriented at 45° relative to the receive cross. Smith et al taught that by arranging the elements in this manner, the secondary lobes in the receive radiation pattern would be located at nulls in the transmit radiation pattern and similarly, the secondary lobes in the transmit radiation pattern would be locate at nulls in the receive pattern. Using an array with 32 transmit elements and 32 receive elements, they obtained a secondary lobe level that was 15 to 20 dB below the main lobe.

SUMMARY OF THE INVENTION

This invention describes a novel array structure which has the beam properties of a "dense" array with $\lambda/2$ element spacing but requires far fewer elements with a greater average element spacing. The invention provides a method of determining the location and weighting of the transmit and receive elements in a sparse array which minimizes both grating lobes and secondary lobes in the radiation pattern of the array. The array of the invention is thus considerably less massive, complex and costly than a dense array having a comparable effective aperture, with commensurate resolution.

The invention accomplishes this by combining a periodic transmit array having a selected element spacing with a periodic receive array having a different element spacing, in such a way that the resulting effective aperture is also periodic and has a spacing between elements that is an interpolation of the respective aperture functions of the transmit and receive arrays. The effective aperture of the resulting array represents an approximation of the effective aperture of a dense array, but the array of the invention requires far fewer elements to accomplish this.

The present invention thus provides a sparse array structure for transmitting and receiving energy, comprising a transmit array including one or more groups of elements, each group comprising at least one element, having an aperture defined by the spacing of the elements and the transmitting apodization of each element, a receive array including one or more groups of elements, each group comprising at least one element, having an aperture defined by the spacing between the elements and the receiving apodization of each element, wherein a convolution of the transmit array aperture and the receive array aperture defines an effective aperture for the sparse array, the elements of the transmit array and the elements of the receive array being interspersed such that the spacing between elements of the transmit array and elements of the receive array provides an effective aperture for the sparse array which is an interpolation of the respective apertures of the transmit array and the receive array approximating an effective aperture of a dense array having the same radiation pattern.

The present invention further provides a synthetic aperture method of creating a sparse array for transmitting and receiving energy, each group comprising at least one element, having an aperture defined by the spacing of the elements and the transmitting apodization of each element and a receive array including groups of elements, each group comprising at least one element, having an aperture defined by the spacing between the elements and the receiving apodization of each element, the elements of the transmit array and the elements of the receive array being interspersed such that the spacing between elements of the transmit array and elements of the receive array provides an effective aperture for the sparse array which is an interpolation of the respective apertures of the transmit array and the receive array approximating an effective aperture of a dense array having the same radiation pattern, comprising synthesizing a desired effective aperture by convolving each individual element in the transmit array with all of the elements in the receive array and summing the results to form the effective aperture.

BRIEF DESCRIPTION OF THE DRAWINGS

In drawings which illustrate, by way of example only, preferred embodiments of the invention.

DETAILED DESCRIPTION OF THE INVENTION

Figure 1:
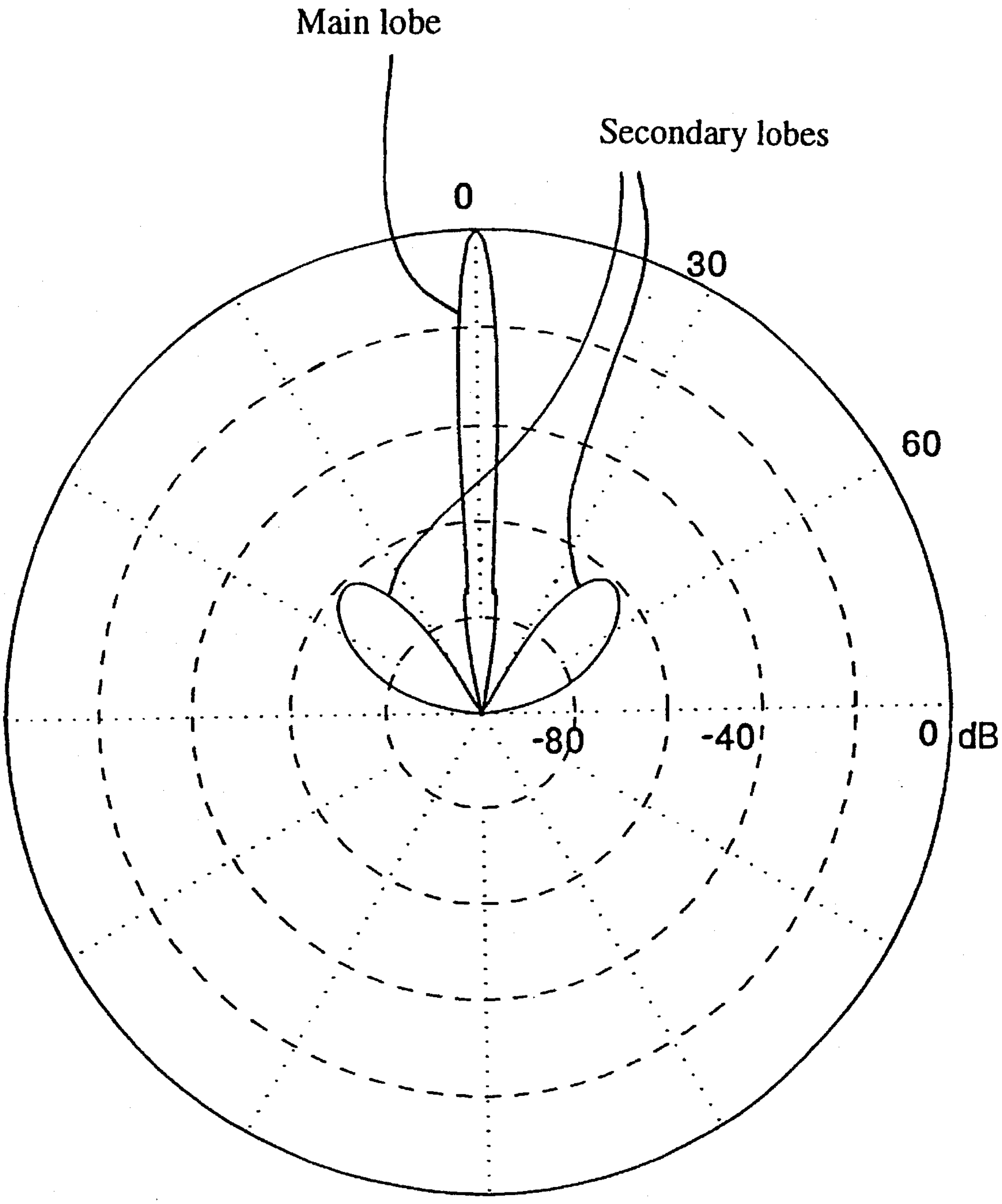
FIG. 1 is a graph showing a typical radiation pattern.
Figure 2:
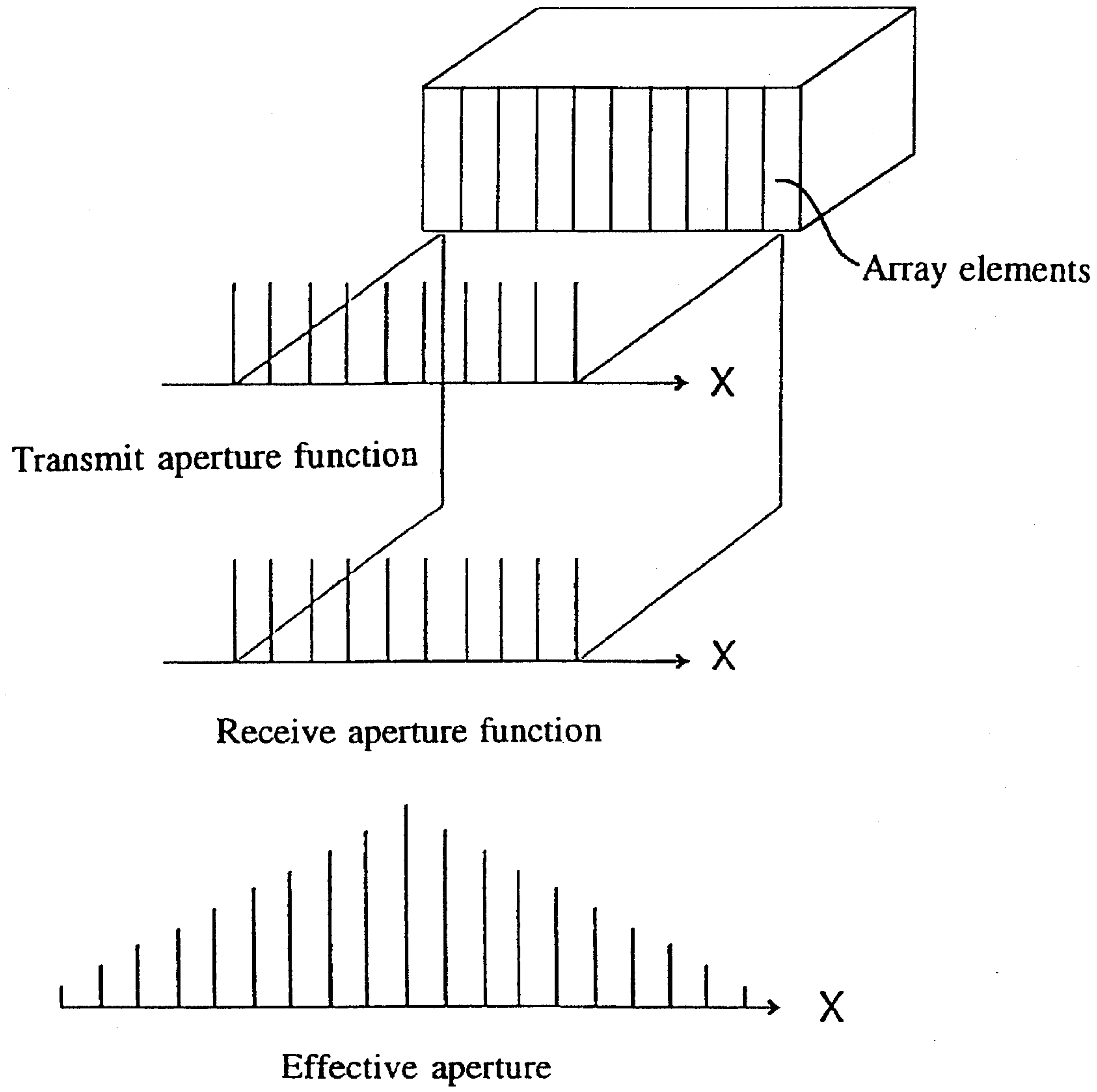
FIG. 2 is a diagrammatic view of the transmit and receive aperture functions and the effective aperture of a typical dense linear array.

The improved array design of the invention is based on the concept that sparse transmit and receive arrays can be designed with different element spacing and weighting to minimize the difference between the effective aperture of the sparse array and a "desired effective aperture". For purposes of this description the "desired effective aperture" is defined as: a) an effective aperture function with approximately $\lambda/2$ element spacing, b) a width equal to twice the width of the array, and c) a smooth shape. The desired effective aperture is equivalent to the effective aperture E(x) of a dense array, defined herein as an array having $\lambda/2$ element spacing in both the transmit and receive aperture functions.

Where $A_S(x)$ and $B_S(x)$ are the aperture functions for the sparse transmit and receive arrays, the effective aperture for the resulting sparse array $E_S(x)$ is defined by the convolution of the aperture functions:

$$E_S(x)=A_S(x)*B_S(x).$$

According to the invention $A_S(x)$ and $B_S(x)$ should be selected to minimize a function $\epsilon$ defined by the formula $$\epsilon=\sum_{i=1}^{n}[\gamma E_S(x)-E(x)]^2$$

where

E(x) is the "desired effective aperture", i.e. the effective aperture of a comparable dense array, n=number of elements in the effective aperture, and $\gamma$=scaling constant.

When $\epsilon$=O agreement is exact and the effective aperture of the sparse array is precisely equal to the effective aperture of a dense array (i.e. with $\lambda/2$ element spacing) having the same radiation pattern, with the exception of the scaling constant $\gamma$.

Although this equation provides criteria for selecting the sparse transmit and receive aperture functions, a method by which the aperture functions can be selected is required. In one method using computer optimization, the location and weighting of elements in the sparse transmit and receive aperture functions can be varied to minimize $\epsilon$ according to this equation. However, a number of different analytical approaches to designing the array of the invention are also available. Different array structures embodying the invention and the approaches that were used to design them are described in the examples set out below.

By choosing appropriate apertures for the transmit and receive arrays which minimize $\epsilon$, it is possible to approximate the performance of a dense array while using a sparse transmit and receive arrays. It can be shown that the minimum total number of elements (i.e. number of transmit elements plus number of receive elements) in the sparse linear array will be obtained when the number of transmit and receive elements are equal to the square root of the number of elements in the effective aperture, although usually more elements are required to obtain the shape of a desired effective aperture.

In the following descriptions of arrays embodying the invention, the required element spacing in the effective aperture of the resulting sparse array is given by "d", with d approximately equal to $\lambda/2$. One of the transmit and receive arrays is referred to as the "A" array and the other as the "B" array; provided that the arrays are symmetrical, no distinction need be made as to which array is the transmit array and which array is the receive array since the transmit-receive radiation pattern is independent of this choice. In all of the examples given, either array can be the transmit array or the receive array.

In a preferred embodiment the A array consists of evenly spaced groups of elements having a particular spacing between groups, and the B array consists of evenly spaced groups of elements having a different spacing between groups. Each group of elements in either array may consist of a single element or a plurality of element. The B array may (and generally will) have a different number of groups than the A array, and as noted above will have different spacing between groups than that of the A array. The following examples illustrate variations of the invention, but are in no way intended to constitute an exhaustive description of available variations.

Example 1: Linear Vernier Interpolation Array

In these examples of an embodiment of the invention involving linear vernier interpolation, each group consists of a single transmitting or receiving element, so the terms "groups" and "element" are interchangeable.

Figure 3:
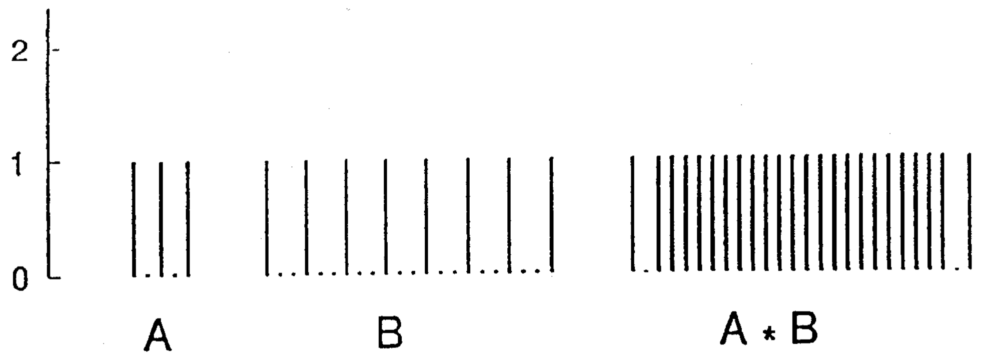
FIG. 3 is a graph showing the element spacing of transmit and receive arrays having uniform apodization and the effective aperture of the resulting sparse array in one embodiment of the invention utilizing a linear vernier interpolation.

A first example of a sparse array structure embodying the invention can be described using an analogy with linear vernier scales. By choosing the element spacing for the B array to be pxd and the element spacing for the A array to be (p−1)d, where p is a constant >1, the element spacing in the effective aperture will be the desired spacing d. This is shown in FIG. 3 for the case p=3. A three element A array with element spacing 2d and an eight element B array with element spacing 3d were used. The resulting effective aperture is flat in shape with element spacing d. However, there is one "element" missing at each end of the effective aperture. These missing "elements" will result in increased secondary lobes in the radiation pattern of the array.

Figure 4:
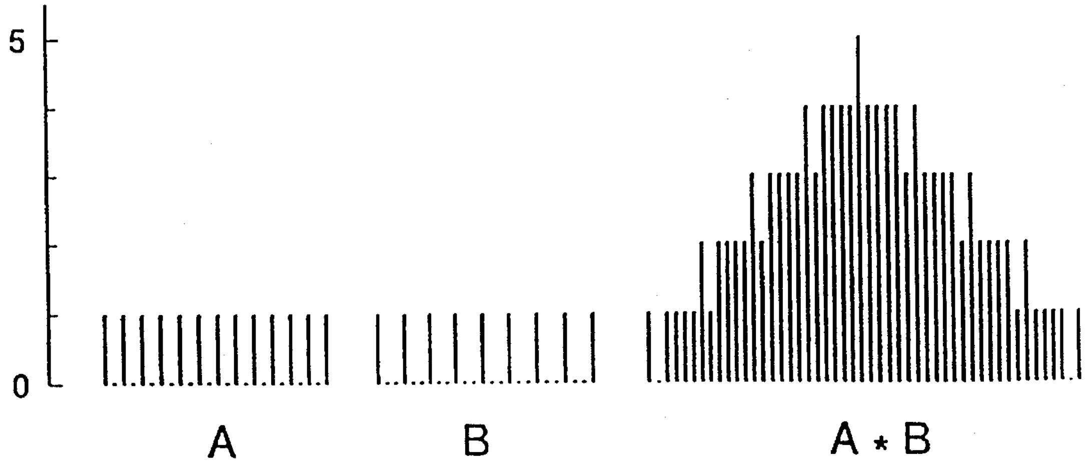
FIG. 4 is a graph showing the element spacing of transmit and receive arrays having uniform apodization and the effective aperture of the resulting sparse array in another embodiment of the invention utilizing a linear vernier interpolation.

If the number of elements g in the A array is increased so that g>p, the effective aperture will no longer be flat but will begin to have an approximately triangular shape. FIG. 4 shows the effective aperture for a 13 element A array and a 9 element B array designed using p=3. In addition to the missing "elements", the effective aperture becomes quite irregular in shape. Both the irregular shape and the missing elements can result in large secondary lobes unless they are corrected.

Control over the shape of the effective aperture can be obtained by controlling the shape of the transmit and receive apertures through weighting of the individual elements in each array. This technique, which is known as "apodization", is commonly used in dense arrays to improve the performance of the array by reducing side lobes. In a sparse array, apodization will reduce not only side lobes but also secondary lobes caused by missing elements and the irregular shape of the effective aperture.

Figure 5:
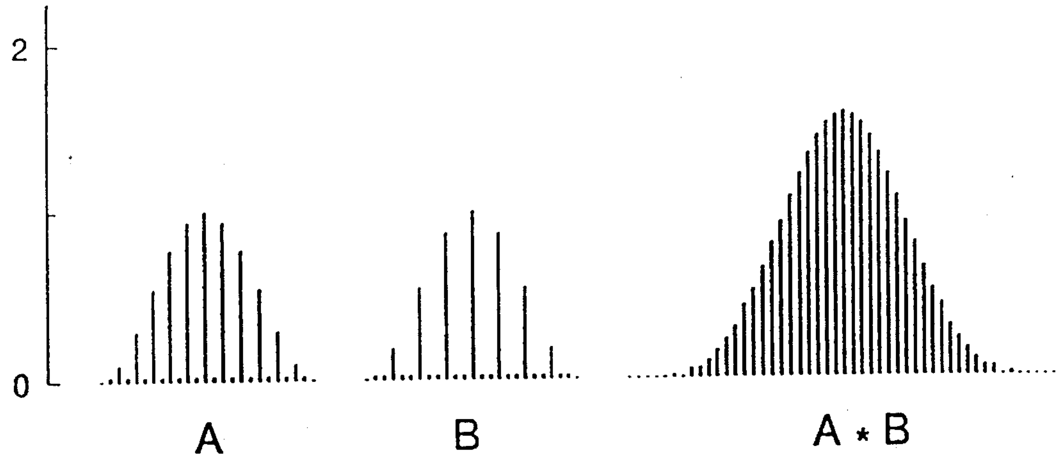
FIG. 5 is a graph showing a sparse array having the element spacing of the arrays of FIG. 4 using a cosine-squared ($\cos^2$) apodization.

FIG. 5 shows the effective aperture that is obtained by apodizing the A and B arrays of FIG. 4 with a cosine squared apodization function. The shape of the effective aperture is smooth and the effect of missing elements has been minimized by decreasing the weighting applied to elements at the edges of the array.

Figure 6:
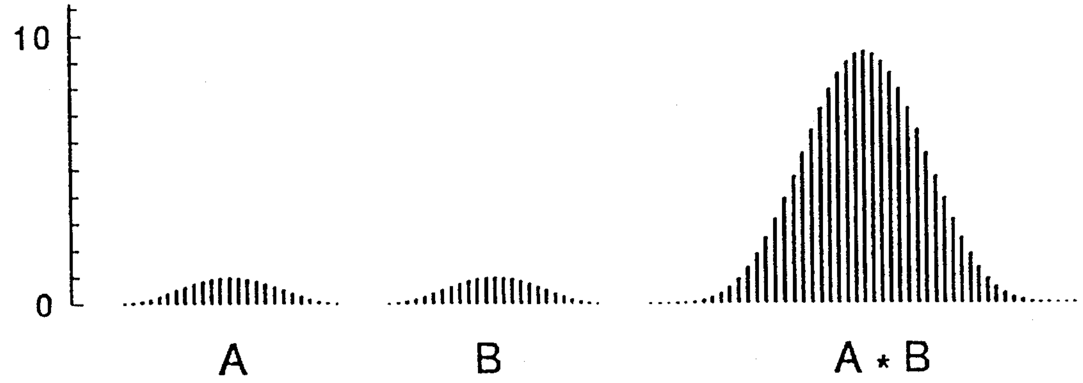
FIG. 6 is a graph showing the dense element spacing of transmit and receive arrays with a cosine-squared apodization in a prior art dense array.

For comparison, FIG. 6 shows a "desired effective aperture" that is obtained using a cosine squared apodized dense 25 element array. The shape and element spacing for the effective apertures in the sparse (FIG. 5) and dense (FIG. 6) arrays are nearly identical even though the sparse array contains less than one-half the number of transmit and receive elements in the dense array. In this example, a calculation of $\epsilon$ would yield a value very close to zero and the transmit-receive radiation pattern for the sparse and dense array would be very similar except for the scaling constant $\gamma$.

Example 2: Rectangular Interpolation Array

Figure 7:
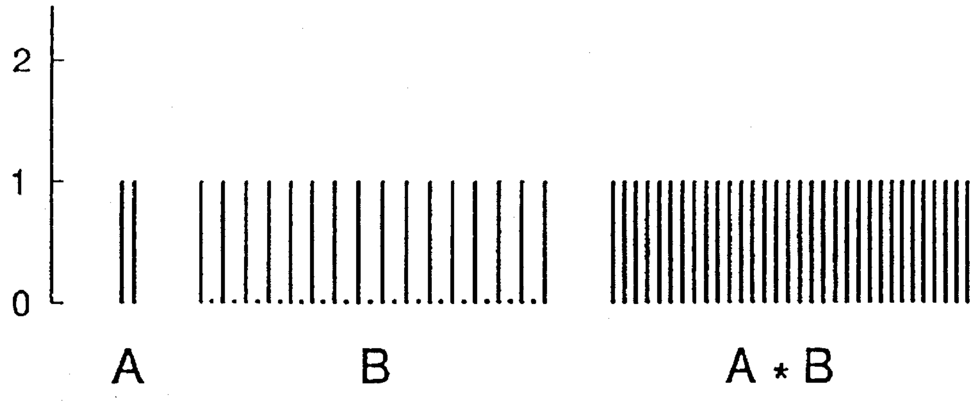
FIG. 7 is a graph showing the element spacing and apodization of transmit and receive arrays an the effective aperture of the resulting sparse array in one embodiment of the invention utilizing a simple rectangular interpolation.

The second example of a sparse array structure according to the invention is based on a rectangular interpolation function. FIG. 7 shows the A array consisting of a single group of two elements with element spacing d, and the B array consisting of 16 groups of elements, each group having a single element, with a spacing of 2d between groups. (It could equally be said that the A array consists of two groups of elements, each group having a single element. However, for purposes of comparison with the more complex embodiments described below, it is useful to consider the A array as having a single group of two elements.)

In the embodiment of FIG. 7 the effective aperture (A*B) has 32 elements with element spacing d. Compared to the effective aperture, every other element in the B array aperture function is missing. It is therefore useful to think of the A array aperture function as an interpolation function whose purpose is to "fill in" the missing elements in the B array. If a larger number of elements are missing in the B array, a larger interpolation function (i.e. a larger A array aperture) would be required. For example, if the element spacing of the B array is 3d, then a 3 element A array would be needed to "fill in" the missing elements.

One difficulty with this approach is that the aperture width of the A array will usually be much smaller than the aperture width of the B array. To solve this problem the A array can be provided with more than one group of elements (each group itself having more than one element). The elements in each group are provided with one spacing between elements, and the groups of elements are provided with a different spacing between groups. In this fashion a number of interpolation functions can be "cascaded" together and the effective aperture of the resulting array will be given by the sum of the contributions from each interpolation function, or group of elements, in the A array.

Figure 8:
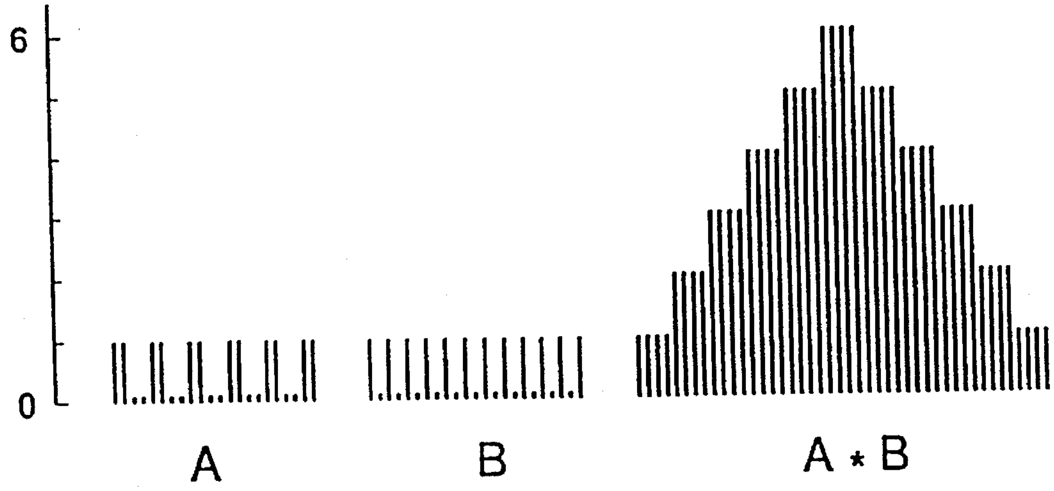
FIG. 8 is a graph showing the element spacing and apodization of transmit and receive arrays and the effective aperture of the resulting sparse array in another embodiment of the invention utilizing a modified rectangular interpolation.

For example, FIG. 8 shows a six-group array with two-element groups. The resulting effective aperture has the desired element spacing d but a stepped triangular shape. These steps in the effective aperture are undesirable since they will contribute to secondary lobes in the radiation pattern of the array, whereas in the "desired effective aperture" the effective aperture has a smooth shape.

Again, apodization can be used to smooth the shape of the effective aperture. The design of sparse arrays using rectangular interpolation functions can thus be described by the following rules: Where the group spacing of the B array is a multiple of d (e.g. the spacing between groups of the B array=pxd where p is a constant>0), then the number of elements in each group of the A array will be p, the spacing between elements in any group in the A array being d. The A array, which provides the rectangular interpolation function, can be formed by cascading a number of these groups together such that the distance between groups of elements in the A array is another multiple of d; for example, the separation between groups in A is kxd where k>0.

Figure 9:
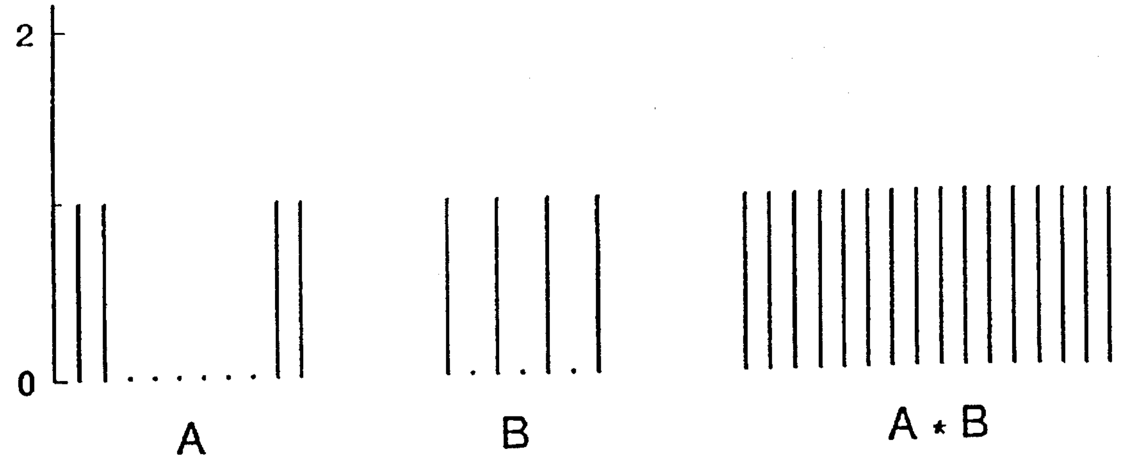
FIG. 9 is a graph showing the element spacing and apodization of transmit and receive arrays and the effective aperture of the resulting sparse array in still another embodiment of the invention utilizing a rectangular interpolation.

FIG. 9 illustrates the A and B arrays and the effective aperture of the resulting array for the case p=2, k=7. In this example, two groups of elements are cascaded together to form the A array and four single-element groups are used in the B array. In this case the minimum total number of elements (number of transmit elements+number of receive elements) has been used to produce the given effective aperture width.

Figure 10:
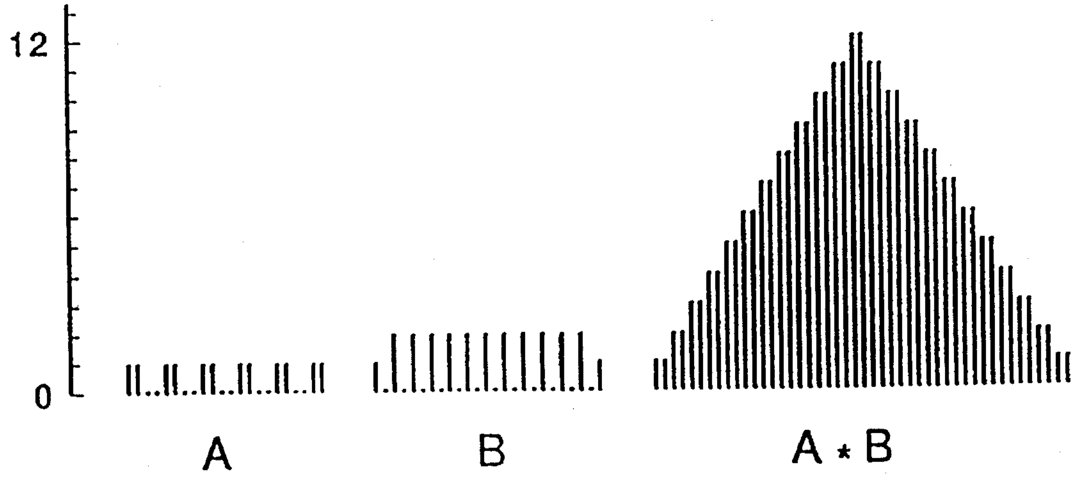
FIG. 10 is a graph showing the element spacing and apodization of transmit and receive arrays and the effective aperture of the resulting sparse array in still another embodiment of the invention utilizing a rectangular interpolation.

A useful variation of the array structure of FIG. 9 is shown in FIG. 10. In this embodiment the A array is identical to that shown in FIG. 8 but the B array has been apodized, by weighting the outer elements by a factor of ½ relative to the central elements. Another way of describing this apodization is adding one step on each end of the B array. The result is that the effective aperture of the resulting array has a much smoother shape and the width of each step and the relative amplitude of the steps are reduced by a factor of 2 compared to the effective aperture shown in FIG. 8.

Figure 11:
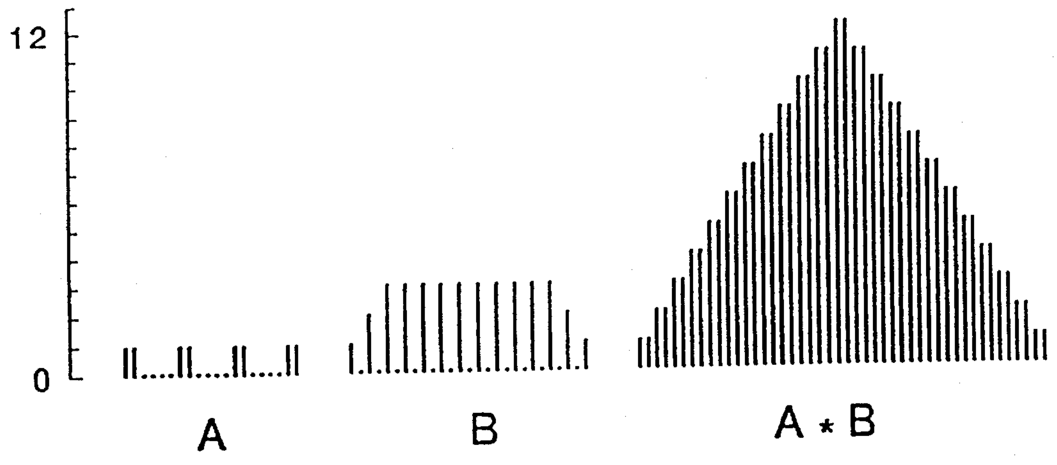
FIG. 11 is a graph showing the element spacing and apodization of transmit and receive arrays and the effective aperture of the resulting sparse array in still another embodiment of the invention utilizing a rectangular interpolation.

Increasing the spacing between groups of elements in the A array will require that the number of steps in the B array be modified. For example, in FIG. 11 the spacing between groups in the A array has been increased from 3to 5d. To obtain the same effective aperture, an additional step in the B array is needed for a total of two steps.

Figure 12:
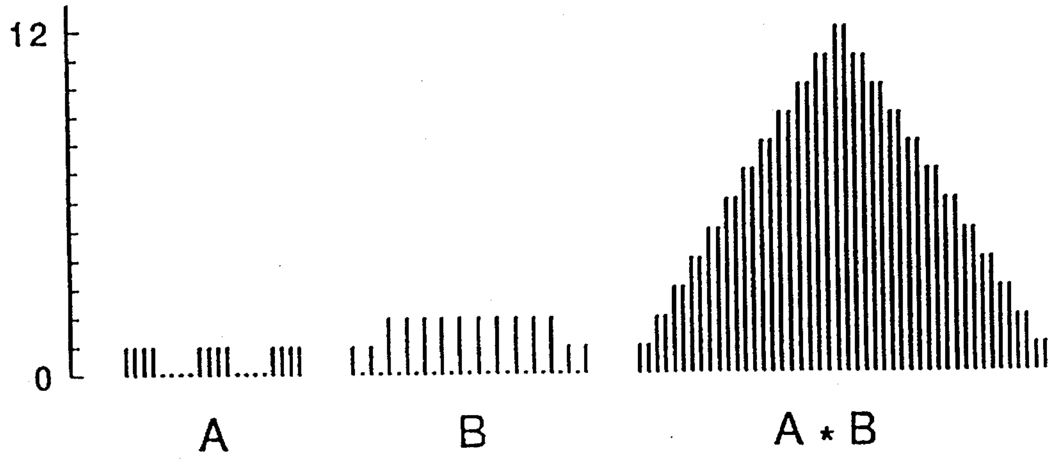
FIG. 12 is a graph showing the element spacing and apodization of transmit and receive arrays and the effective aperture of the resulting sparse array in still another embodiment of the invention utilizing a rectangular interpolation.

FIG. 12 shows another variation of the rectangular interpolation array. In this example four-element groups are used in the A array instead of the two-element groups used in FIGS. 10 and 11. The corresponding B array has one step of width two single-element groups.

Figure 13:
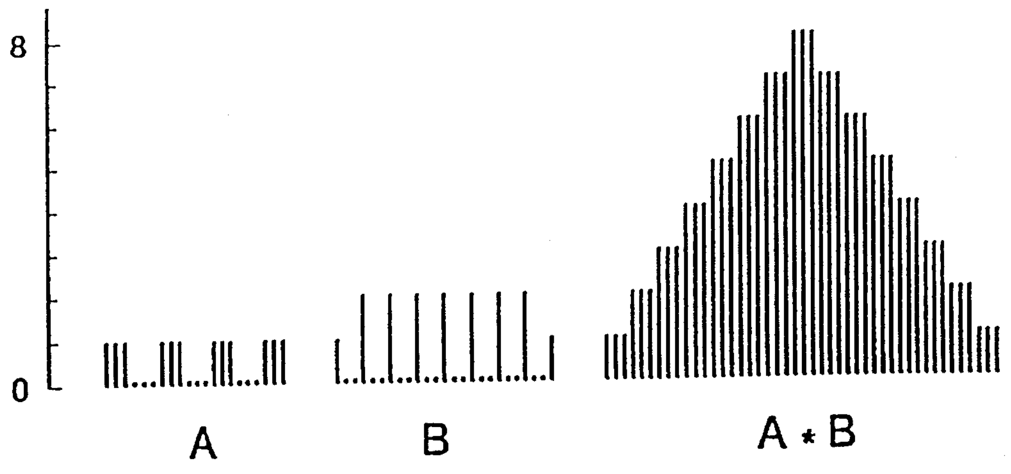
FIG. 13 is a graph showing the element spacing and apodization of transmit and receive arrays and the effective aperture of the resulting sparse array in still another embodiment of the invention utilizing a rectangular interpolation.

It is also possible to change the element spacing in the B array. FIG. 13 shows an example of a nine group (one element per group) B array with one step and element spacing 3d. Four three-element groups are used in the A array. However, the cost of increasing the B array element spacing is the proportional increase in the size of the steps in the effective aperture.

Figure 14:
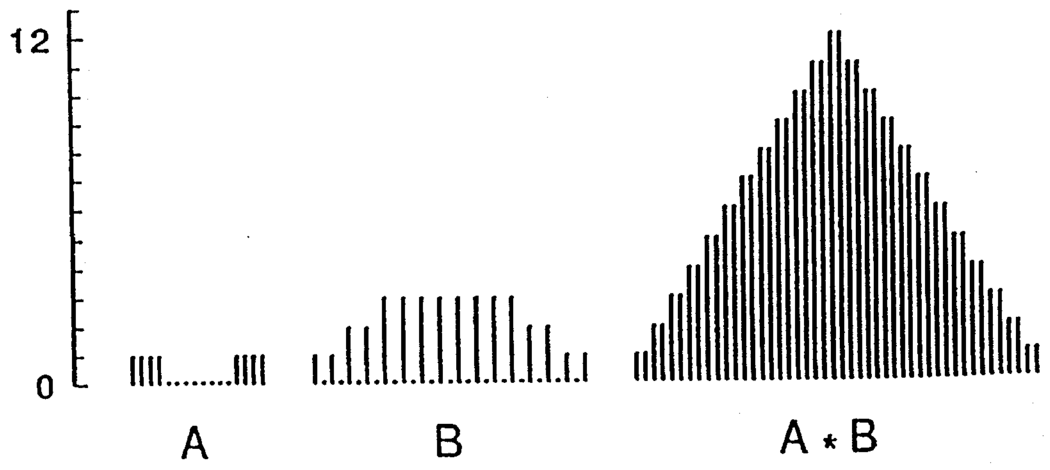
FIG. 14 is a graph showing the element spacing and apodization of transmit and receive arrays and the effective aperture of the resulting sparse array in still another embodiment of the invention utilizing a rectangular interpolation.

The design of sparse arrays, such as those shown in FIGS. 10–13, can be described by the following rules: Where the element spacing in the B array is pxd, p being >0, the number of steps in the B array is selected to be n where n is an integer ≧0 and the number of elements in each step of the B array is selected to be m where m is an integer >0; the number of elements in each rectangular interpolation function (i.e. in each group in the A array) will be given by pxm, and the spacing between groups in the A array will be given by (pxmxn+1)d. For example, if p=2, n=2 and m=2, there will be 4 elements in each group of elements in the A array and the groups will be separated by a distance of 7d. The A array, B array and effective aperture for this example are shown in FIG. 14.

Example 3: Triangular Interpolation Array

Figure 15:
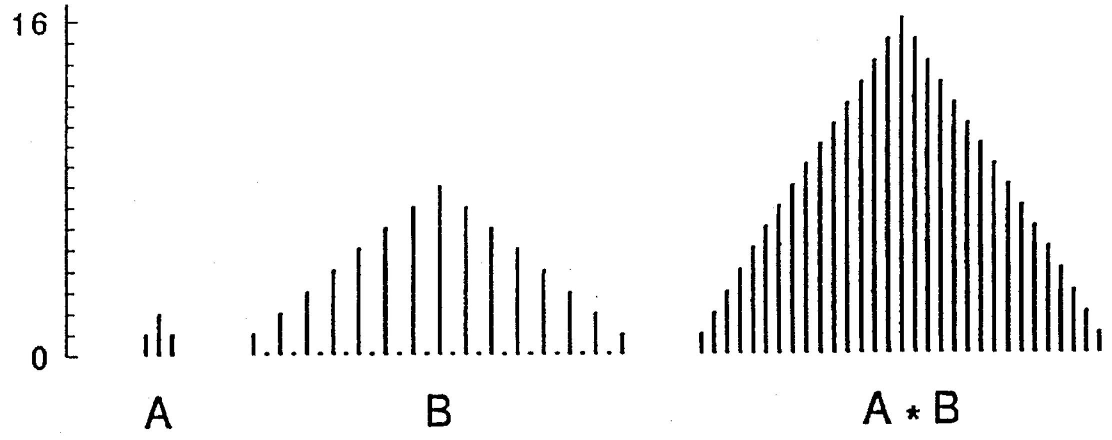
FIG. 15 is a graph showing the element spacing and apodization of transmit and receive arrays and the effective aperture of the resulting sparse array in one embodiment of the invention utilizing a triangular interpolation.
Figure 16:
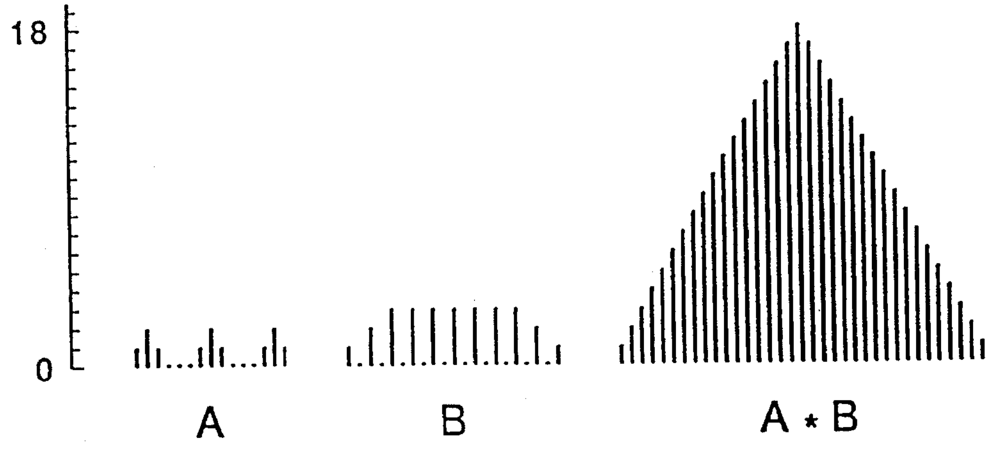
FIG. 16 is a graph showing the element spacing and apodization of transmit and receive arrays and the effective aperture of the resulting sparse array in another embodiment of the invention utilizing a triangular interpolation.

The third example of a sparse array structure embodying the invention is based on triangular interpolation functions. FIG. 15 illustrates that the simple three element triangular interpolation function representing the three-element group of the A array can perfectly fill in the missing "elements" in a sparse triangular shaped B array. Again, to increase the aperture width of the A array, a number of such groups can be cascaded together in the A array, as in FIG. 16 which illustrates an A array consisting of three cascaded three-element groups. To produce a perfect triangular effective aperture, the B array is not apodized to be triangular in shape but rather is made flat with two steps, similar to the B arrays that were used with the rectangular interpolation functions shown in FIGS. 9–13.

Figure 17:
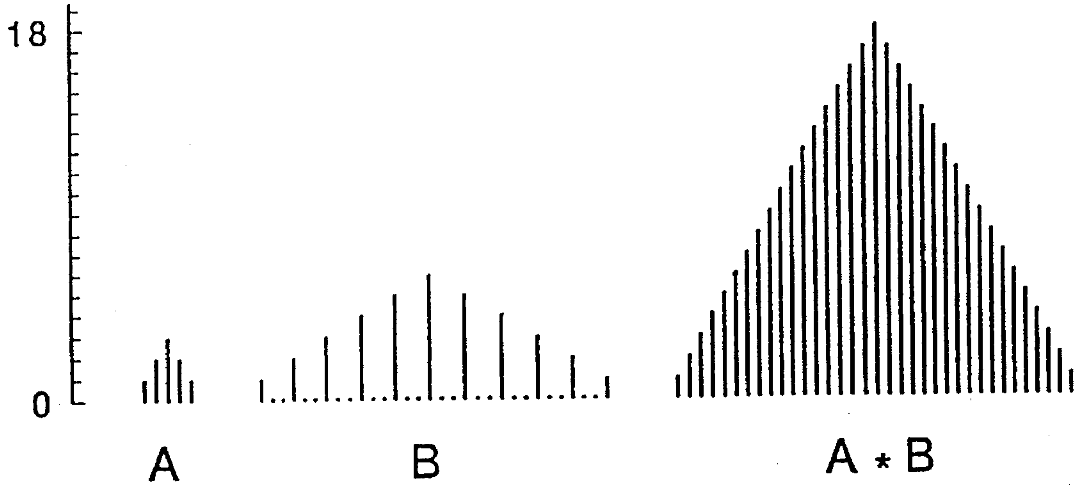
FIG. 17 is a graph showing the element spacing and apodization of transmit and receive arrays and the effective aperture of the resulting sparse array in still another embodiment of the invention utilizing a triangular interpolation.

If the B array element (i.e. group) spacing is increased, more elements will be required in each group in the A array. FIG. 17 shows the interpolation function of the A array for a B array with element spacing of 3d. Provided that the desired effective aperture is triangular in shape, it will be possible, using groups with triangular interpolation functions, to exactly obtain the desired effective aperture since a triangular shaped function can always be reduced to a sum of identical smaller triangular shaped functions.

Figure 18:
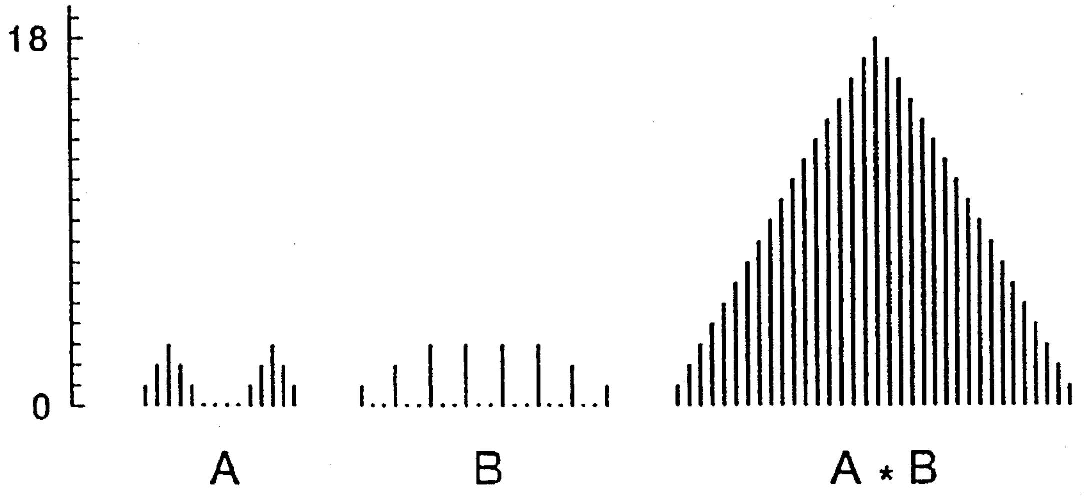
FIG. 18 is a graph showing the element spacing and apodization of transmit and receive arrays and the effective aperture of the resulting sparse array in still another embodiment of the invention utilizing a triangular interpolation.

The design of sparse arrays using triangular interpolation functions can thus be described by the following rules: Where the element spacing of the A array is d, the element spacing of the B array is pxd (p>0), and where the number of steps in the B array is n; then the number of elements in each group of elements (triangular interpolation functions) in the A array will be (2p–1), and the distance separating the groups will be ((n–1)p+2)d. For example, if p=3, and n=2, the number of elements in each group in the A array will be 5 and the groups will be separated by 5d. An example of an array designed using p=3, n=2 is shown in FIG. 18.

Figure 19:
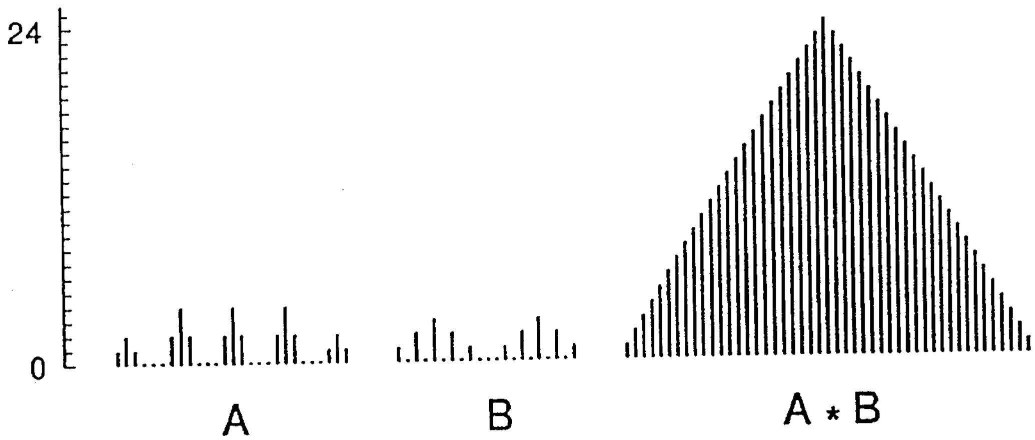
FIG. 19 is a graph showing the element spacing and apodization of transmit and receive arrays and the effective aperture of the resulting sparse array in still another embodiment of the invention utilizing a triangular interpolation.

One variation on the design of arrays using triangular interpolation is shown in FIG. 19. In this example, the B array consists of two groups of five elements each, represented by the two cascaded triangular functions illustrated. The A array still consists of five groups of three elements each, represented by the five cascaded triangular interpolation functions illustrated, but a step in the weighting as between the groups has been introduced. In this case the A array has been apodized so that the outer groups have one-half the weighting of the central groups.

This variation on the design of sparse arrays using triangular interpolation functions is defined by the following rules: Where the element spacing of the A array is d, the element spacing of the B array is pxd (p>0), the number of elements in each group of elements in the B array is 2f–1 where fεI>1, and the number of steps in the element weighting applied to the A array is n where nεI>0; then the number of elements in each group in the A array will be 2p–1, the distance between groups will be d(p(f–2)+2) and the distance between groups of elements in the B array will be d(p(f(n–1)+2)).

Figure 20:
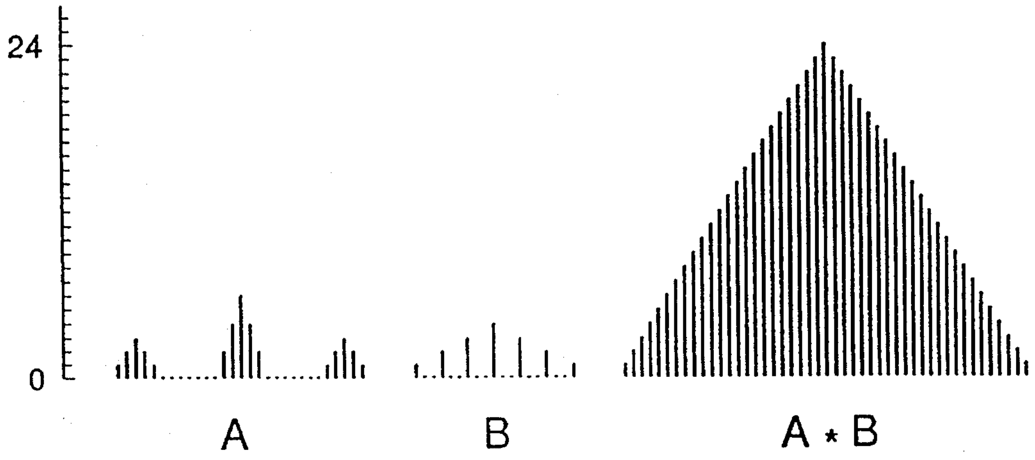
FIG. 20 is a graph showing the element spacing and apodization of transmit and receive arrays and the effective aperture of the resulting sparse array in still another embodiment of the invention utilizing a triangular interpolation.
Figure 21:
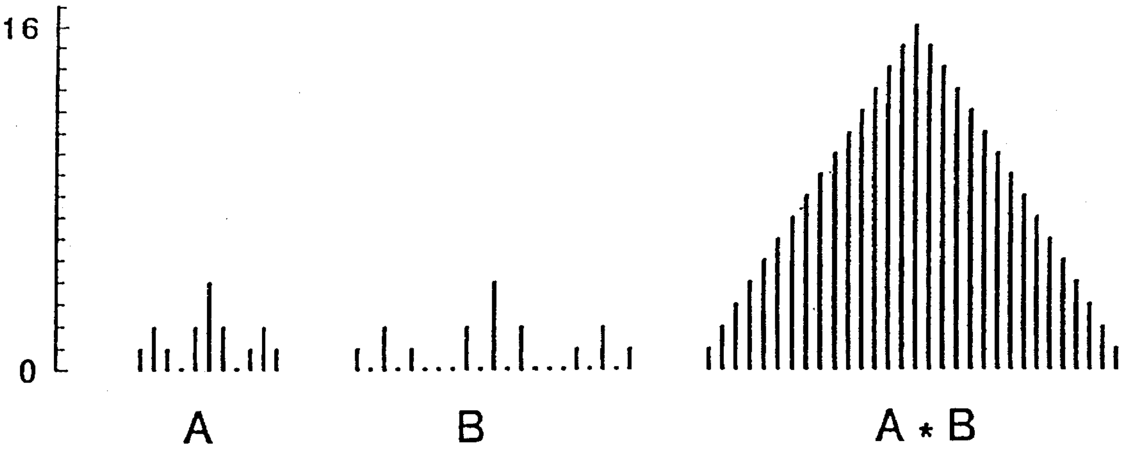
FIG. 21 is a graph showing the element spacing and apodization of transmit and receive arrays and the effective aperture of the resulting sparse array in still another embodiment of the invention utilizing a triangular interpolation.

An example of an array designed using p=3, n=1 and f=4 is shown in FIG. 20. The B array consists of a single group apodized to a triangular function, although if a larger aperture were desired multiple groups could be cascaded together. A further variation on the design of sparse arrays using triangular interpolation is shown in FIG. 21. Similar to the example of FIG. 20, triangular functions are used in both the A and B arrays, but a step in the element weighting has been applied to the triangular functions in both the A and B arrays, each of which consists of three three-element groups apodized to triangular interpolation functions.

In all of the above examples, a "synthetic aperture" method can be used for controlling the shape of the effective aperture and the radiation field. To form a synthetic aperture each element in the transmit array is separately convolved with all of the elements in the receive array, and the results are summed to synthesize the desired effective aperture. In terms of forming the beam this means that each transmitter element is excited in turn and the signals are recorded for the plurality of receiver elements with each excitation. Once a complete set of signal information has been collected, the image field is reconstructed by summing the received signals with appropriate delays and apodization. Since it is possible in this method to control the weighting applied to individual transmitter-receiver pairs, a weighting can be selected to correspond to the desired effective aperture. In general, the synthetic aperture method can be used to generate any desired effective aperture, with the minimum number of array elements, provided that the product of the number of transmit elements and receive elements is equal to the desired number of effective aperture elements.

Figure 22:
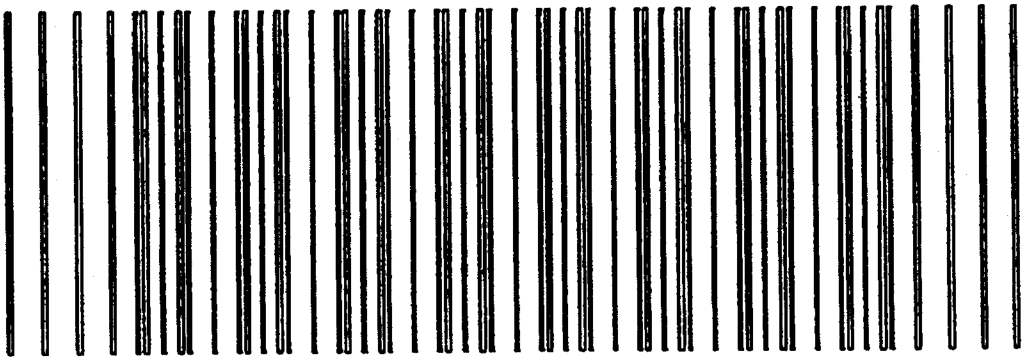
FIG. 22 is a diagrammatic view showing the element spacing of a sparse array in an embodiment of the invention utilizing a linear vernier interpolation.

FIG. 22 illustrates an experimental implementation of the invention in a sparse array designed using linear vernier interpolation between a 31-element transmit array and a 31-element receive array with p=4, d=λ/2. Although the spacing between the elements of the transmit array and the elements of the receive array is not equal, the spacing between elements in the effective aperture of this array is equal, and the resulting array is thus periodic.

Since the cost of an ultrasound imaging system is proportional to the number of elements in the array, the advantage of implementing the new sparse array structure is obvious. It should be noted that the signal to noise ratio of the system will decrease with increasing sparseness but there are known ways to compensate for this.

Figure 23:
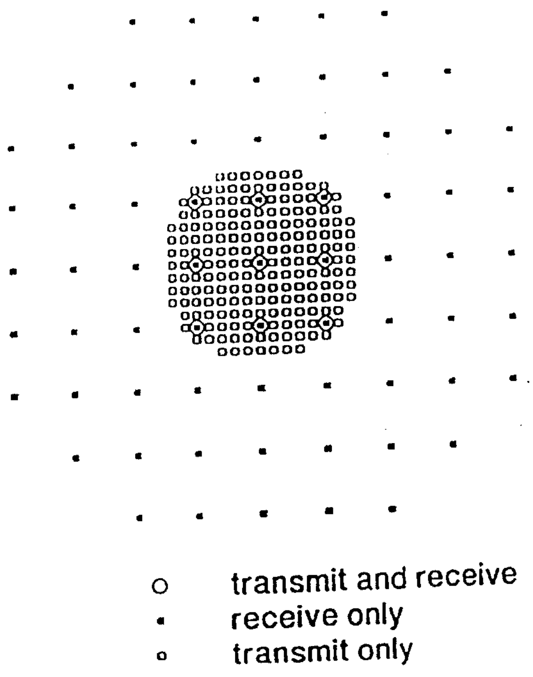
FIG. 23 is a diagrammatic view showing the element spacing of a sparse two-dimensional array in an embodiment of the invention utilizing a rectangular interpolation.
Figure 24:
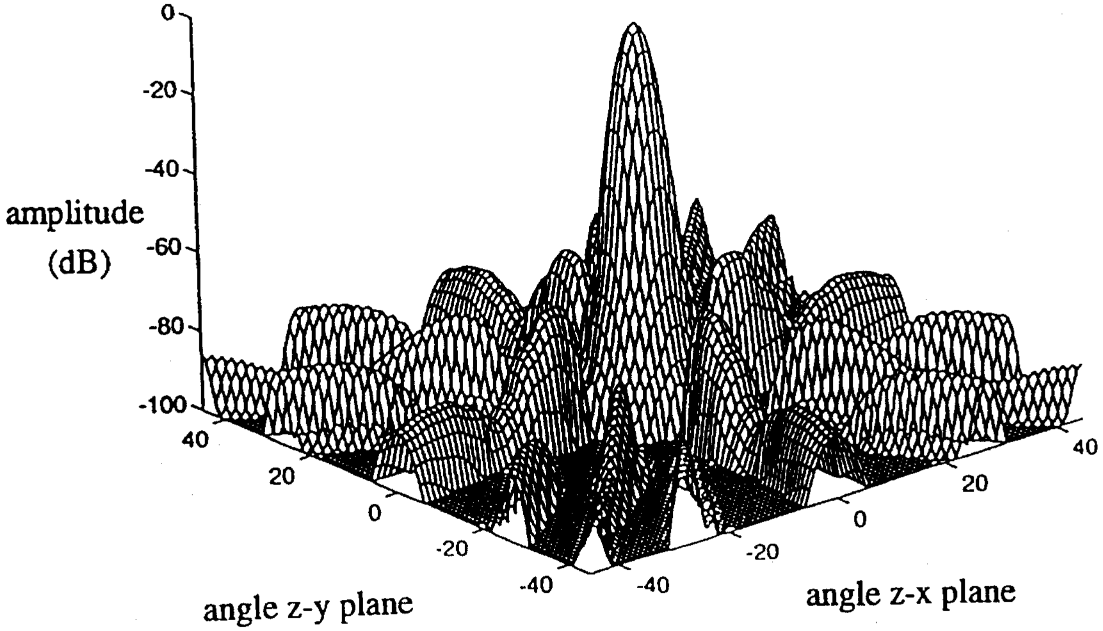
FIG. 24 is a graph showing a radiation pattern for the two-dimensional array illustrated in FIG. 23.

FIG. 23 shows the geometry for a two dimensional array with 69 receiver elements and 193 transmit elements. The array was designed using rectangular interpolation with p=5, k=1 and d=λ/2. A cosine apodization function was used. The simulated transmit-receive radiation pattern for this array is shown in FIG. 24. The radiation pattern was calculated at a distance equal to four times the width of the receive aperture. The largest secondary lobe in the radiation pattern is approximately 65 dB smaller than the main lobe. This arrangement should be suitable for high quality medical imaging, and is considerably better than prior art approaches such as that described by Smith et al., referred to above.

The invention having thus been described with reference to preferred embodiments by way of example only, it will be apparent to those skilled in the art that certain adaptations and modifications may be made without departing from the scope of the invention, as defined by the appended claims. For example, although the above examples relate to linear arrays, the invention is equally applicable to two-dimensional and three-dimensional arrays.

We claim:

1. A sparse array structure for transmitting and receiving energy having a transmit array comprising transmit elements and a receive array comprising receive elements, comprising a first array being one of the transmit array or the receive array, having at least one group of elements comprising a plurality of elements, each group of elements in the first array having the same number of elements, a second array being the other of the transmit array or the receive array, having at least one group of elements comprising a plurality of elements, each group of elements in the second array having the same number of elements, the elements within each group of elements in the first array being evenly spaced apart by a first spacing which is an integer multiple of a spacing d and the elements within each group of elements in the second array being evenly spaced apart by a second spacing which is another integer multiple of the spacing d, in which d is the spacing between elements in an effective aperture of a dense array having substantially the same radiation pattern, the first array having a first aperture defined by the spacing between the elements in the first array and an apodization of each element in the first array, and the second array having a second aperture defined by the spacing between the elements in the second array and an apodization of each element in the second array, whereby a convolution of the first aperture an the second aperture defines an effective aperture for the sparse array, and means for apodizing the elements, wherein the spacing of the elements in the first array and the spacing of the elements in the second array creates an effective aperture for the sparse array having an aperture function with the spacing d between elements.

2. The sparse array of claim 1 in which the spacing between elements in the first array is p×d and the spacing between elements in the second array is (p−1)d, where p is an integer greater than 1.

3. The sparse array of claim 2 in which p>2.

4. The sparse array of claim 1 in which the first array comprises a periodic arrangement of n groups of elements, the spacing between elements in each group being d and the number of elements in each group being m×p, and the second array comprises a periodic arrangement of k elements, the spacing between elements in the second array being p×d, where p is an integer greater than 1, n is an integer greater than 1, m is an integer greater than 0, and k is an integer greater than 0.

5. The sparse array of claim 1 in which the first array comprises a periodic arrangement of n groups of elements, the spacing between elements in each group being d and the number of elements in each group being m×p, and the second array comprises a periodic arrangement of k elements, the spacing between elements in the second array being p×d, where n=1, p is an integer greater than 1, m is an integer greater than 0, and k is an integer greater than 0 and k≠m.

6. The sparse array of claim 2 in which the first array comprises a periodic arrangement of n groups of elements, the spacing between elements in each group being d and the number of elements in each group being m×p, and the second array comprises a periodic arrangement of k elements, the spacing between elements in the second array being j such that j=(p+1)/2, where n is an integer greater than 1, m is an integer greater than 0, p is an odd integer greater than 1, and k is an integer greater than 0.

7. The sparse array of claim 2 in which the first array comprises a periodic arrangement of n groups of elements, the spacing between elements in each group being d and the number of elements in each group being m×p, and the second array comprises a periodic arrangement of k elements, the spacing between elements in the second array being j such that j=(p+1)/2, where n=1, m is an integer greater than 0, p is an odd integer greater than 1, k is an integer greater than 0, and (j×k−1)≠(m×p).

8. A sparse array structure for transmitting and receiving energy having a transmit array comprising transmit elements and a receive array comprising receive elements, comprising a first array being one of the transmit array or the receive array, having at least one group of elements comprising a plurality of elements, each group of elements in the first array having the same number of elements, a second array being the other of the transmit array or the receive array, having at least one group of elements comprising a plurality of elements, each group of elements in the second array having the same number of elements, the elements within each group of elements in the first array being evenly spaced apart by a first spacing which is an integer multiple greater than 1 of a spacing d and the elements within each group of elements in the second array being evenly spaced apart by a second spacing which is another integer multiple greater than 1 of the spacing d, in which d is the spacing between elements in an effective aperture of a dense array having substantially the same radiation pattern, the first array having a first aperture defined by the spacing between the elements in the first array and an apodization of each element in the first array, and the second array having a second aperture defined by the spacing between the elements in the second array and an apodization of each element in the second array, whereby a convolution of the first aperture and the second aperture defines an effective aperture for the sparse array, and means for apodizing the elements, wherein the spacing and apodization of the elements in the first array and the elements in the second array creates an effective aperture for the sparse array which approximates an effective aperture of a dense array having the spacing d between elements and substantially the same radiation pattern as the sparse array.

9. The sparse array of claim 8 in which the spacing between elements in the first array is p×d and the spacing between elements in the second array is (p−1)d, where p is an integer greater than 1.

10. The sparse array of claim 9 in which p>2.

11. A method of imaging a target using a sparse array structure for transmitting and receiving energy having a transmit array comprising transmit elements and a receive array comprising receive elements, comprising a first array being one of the transmit array or the receive array, having at least one group of elements comprising a plurality of elements, a second array being the other of the transmit array or the receive array, having at least one group of elements comprising a plurality of elements, the elements within the group of elements in the first array being evenly spaced apart by a first spacing which is an integer multiple of a spacing d, each group of elements in the first array having the same number of elements, and the elements within the group of elements in the second array being evenly spaced apart by a second spacing which is another integer multiple of the spacing d, each group of elements in the second array having the same number of elements, in which d is the spacing between elements in an effective aperture of a dense array having substantially the same radiation pattern, the first array having a first aperture defined by the spacing between the elements in the first array and the transmitting apodization of each element in the first array, and the second array having a second aperture defined by the spacing between the elements in the second array and the receiving apodization of each element in the second array, whereby a convolution of the first aperture and the second aperture defines an effective aperture for the sparse array having an aperture function with substantially the spacing d between elements, comprising the steps of:

apodizing the elements of the transmit array and the receive array to create an effective aperture for the sparse array which approximates an effective aperture of a dense array having the same radiation pattern, transmitting an energy signal through all of the elements of the transmit array, receiving the energy signal through all of the elements of the receive array, and forming an image of the received signal.

12. The method of claim 11 in which the spacing between elements in the first array is p×d and the spacing between elements in the second array is (p−1)d, where p is an integer greater than 1.

13. The method of claim 11 in which the first array comprises a periodic arrangement of n groups of elements, the spacing between elements in each group being d and the number of elements in each group being m×p, and the second array comprises a periodic arrangement of k elements, the spacing between elements in the second array being p×d, where p is an integer greater than 1, n is an integer greater than 1, m is an integer greater than 0, and k is an integer greater than 0.

14. The method of claim 11 in which the first array comprises a periodic arrangement of n groups of elements, the spacing between elements in each group being d and the number of elements in each group being m×p, and the second array comprises a periodic arrangement of k elements, the spacing between elements in the second array being p×d, where n=1, p is an integer greater than 1, m is an integer greater than 0, and k is an integer greater than 0 and k≠m.

15. The method of claim 11 in which the first array comprises a periodic arrangement of n groups of elements, the spacing between elements in each group being d and the number of elements in each group being m×p, and the second array comprises a periodic arrangement of k elements, the spacing between elements in the second array being j such that j=(p+1)/2, where n is an integer greater than 1, m is an integer greater than 0, p is an odd integer greater than 1, and k is an integer greater than 0.

16. The method of claim 11 in which the first array comprises a periodic arrangement of n groups of elements, the spacing between elements in each group being d and the number of elements in each group being m×p, and the second array comprises a periodic arrangement of k elements, the spacing between elements in the second array being j such that j=(p+1)/2, where n=1, m is an integer greater than 0, p is an odd integer greater than 1, k is an integer greater than 0, and (j×k−1)≠(m×p).

* * * * *